G. HARTER.
CONSTRUCTION OF SHIPS.
APPLICATION FILED MAR. 26, 1920.

1,359,059.

Patented Nov. 16, 1920.
8 SHEETS—SHEET 1.

INVENTOR:
Godfrey Harter
By Wm Wallace White
ATTY

G. HARTER.
CONSTRUCTION OF SHIPS.
APPLICATION FILED MAR. 26, 1920.

1,359,059.

Patented Nov. 16, 1920.
8 SHEETS—SHEET 4.

INVENTOR:
Godfrey Harter
By Wm Wallace White
ATTY.

FIG. 16.

G. HARTER.
CONSTRUCTION OF SHIPS.
APPLICATION FILED MAR. 26, 1920.

1,359,059.

Patented Nov. 16, 1920.
8 SHEETS—SHEET 8.

INVENTOR:
Godfrey Harter
BY Wm Wallace White
ATTY.

UNITED STATES PATENT OFFICE.

GODFREY HARTER, OF LONDON, ENGLAND.

CONSTRUCTION OF SHIPS.

1,359,059. Specification of Letters Patent. Patented Nov. 16, 1920.

Application filed March 26, 1920. Serial No. 368,898.

*To all whom it may concern:*

Be it known that I, GODFREY HARTER, of 42 Harcourt Terrace, London, S. W. 10, England, a subject of the King of Great Britain and Ireland, have invented certain new and useful Improvements in or Relating to the Construction of Ships, of which the following is a specification.

This invenion relates to the construction of navigable sea going ships of moderate and large size and is for the purpose of simplifying the construction.

Experience of years, as well as modern experiment and research, show that a ship's hull must conform more or less to certain shapes in order to be propelled at a given speed with a minimum of power and at the same time to be seaworthy.

Such forms are usually bounded by surfaces which are twisted and curved in all directions, and therein lies the reason for much of the expense connected with the building of ships.

Attempts have from time to time been made to evolve forms which, while maintaining navigational requirements, are less complicated to construct. Notable are designs in which the transverse frames are composed of straight lengths, known as straght line ships.

The object of this invention is to still further simplify the construction while maintaining such curved stream lines as are necessary for seaworthiness and economy of propulsive effort.

In carrying this invention into effect, the principal features and general form of the ship are first decided on and then the actual surface of the hull is made to conform to certain characteristic shapes.

For this purpose the plating of the hull and decks (where it is not desirable to use flat plating as may be done for the amidships portion of the bottom and sides for instance, and for certain decks) is divided into a number of "non-twisted surfaces" having curvature in a longitudinal direction only, with or without "chine surfaces" of uniform transverse section. The "chine surfaces" if used, alternate with the "non-twisted surfaces." Hence a transverse section through the hull at any point consists of straight lines corresponding to the "non-twisted surfaces," such straight lines either meeting each other at angular chines or joined together by curved or straight lines corresponding to the chine surface. The straight lines of one section will be parallel to the corresponding straight lines of the adjacent sections and the curved or straight lines will be uniform throughout the length of a chine.

The words "transverse" and "transversely" as used throughout this specification and claims mean lying in planes substantially perpendicular to the longitudinal vertical center plane of the ship and substantially perpendicular to the base line or water plane of the ship, such transverse planes all being parallel to each other.

The term "surface," as used in the specification and claims, means a surface inclosing appreciable volume. In the case of the sides and bottom, such a surface incloses a volume which contributes to the displacement or cubic capacity of the ship. In the case of a deck, it incloses volume which contributes to the space inclosed by the deck (*e. g.*, tonnage space). Bilge keels, center keels, rudders, deadwood and the like are not here considered as "surfaces" as they do not inclose an appreciable volume and do not contribute materially to the displacement of the ship.

The term "non-twisted surface," as used in the specification and claims, means a surface having curvature only in a longitudinal direction, without any twist and without curvature in a "transverse" direction. A "transverse" section through such a surface is a straight line and all "transverse" sections are straight lines parallel to each other. I do not include other surfaces having curvature in one direction only, without twist, but I only include surfaces where the curvature is entirely in a longitudinal direction, that is to say, where the straight lines which lie on the surface are in "transverse" planes.

The term "chine surface," as used in the specification and claims, means a surface (usually relatively narrow in "transverse" direction compared with "non-twisted surfaces") used for connecting together two non-twisted surfaces at a chine. Such surfaces may, however, be several feet wide in a large ship. The "chine surfaces" may be of any suitable "transverse" section but will usually be circular. They will, however, be of uniform width and "transverse" section throughout the length of one chine, and will be without twist. Their curvature in a longitudinal direction will, of course, be dependent on the form of the "non-twisted surfaces" to which they are connected. Although the plates forming a "chine surface" may have curvature in two directions, it will easily be seen that the maintenance of a uniform "transverse" curvature greatly facilitates their formation, as standard templets, dies or rolls, may be used for impressing the longitudinal curvature.

In carrying out this invention, the middle body of the ship, including so much of the length of the vessel as is made of uniform transverse section may be made of any suitable section as regards the bottom and sides, as this portion of the vessel is comparatively simple to build in any case. The preferable section would, however, be approximately rectangular with a bottom either horizontal or inclined slightly from the keel to the bilge, joined to approximately vertical sides by a rounded or chamfered bilge.

My invention applies particularly to those portions of the vessel which are not of uniform transverse section, hereinafter termed the "forebody" and the "afterbody."

My invention lies in forming the side and bottom skin of the forebody, or the side and bottom skin of the afterbody (or both) each mainly of not less than three "non-twisted surfaces" with or without "chine surfaces," side by side (in a given transverse section) on either side of the longitudinal vertical center plane. Although "non-twisted surfaces" may be used without "chine surfaces," it will be seen that " chine surfaces" cannot be used without the "non-twisted surfaces." It will be observed also that the transverse form of the chine surfaces is easily kept uniform throughout a chine because the two edges of the chine surface are inclined to each other at a constant angle in order to fit against the "non-twisted surfaces" on either side, the latter being inclined to each other at a constant angle. Owing to the uniformity of "transverse" section of the chine surfaces and the section through the "non-twisted surfaces" being straight lines, the work of designing and fairing the lines is simplified.

The non-twisted surfaces may be partly curved and partly straight in a longitudinal direction, and in some cases one or more of the surfaces may be entirely straight (flat) but all of the surfaces will never be flat. A construction consisting wholly of flat surfaces for the bottom and sides, such as might be used for pontoons and barges would be very simple to build but would be impracticable for a ship principally on account of high resistance to propulsion or unseaworthiness.

It should be understood that the non-twisted surfaces may be of any convenient length in a longitudinal direction and need not extend for the full length of the forebody, or afterbody, especially in the case of the side and bottom surfaces. Change of form between one transverse section and another may be brought about by one non-twisted surface gradually dying away and another at a different slope taking its place, by gradually increasing in width. This system obviates the necessity for twisting the plates, which is what is usually done in "straight-line" ships. A twisted surface is not perfectly developable and the action of twisting the plates stretches the edges to such an extent as to at least affect the fairness of the rivet holes. Further a different number of non-twisted surfaces, side by side, may be used at different parts of the forebody and at different parts of the afterbody. Further, in the case of side and bottom plating, at the extreme bow adjoining the stem, (and at the extreme stern adjoining the stern post, as for instance, in the case of a vessel with pointed stern) the number of non-twisted surfaces may be reduced to two or even one on each side, but this will be only local, and there will always be at least three non-twisted surfaces side by side transversely for a large part of the forebody and (or) afterbody.

In cases where the vessel has a flat floor of course the non-twisted surface forming the bottom is continuous across both sides of the keel plate so that three non-twisted surfaces each side is then equivalent to five non-twisted surfaces in both sides.

Straight line vessels of rectangular midship section of only two surfaces between the sheer line and the keel on each side of the longitudinal center plane at one transverse section would not be practicable as navigable sea-going ships unless the surfaces were twisted (as is usual), as they would be either too resistful to be economical in propulsive effort or else unseaworthy or otherwise impracticable.

My invention further lies in forming the deck mainly of three or more non-twisted surfaces similar to those forming the sides and bottom, that is to say in any one surface any lines drawn transversely to the length of the ship are straight and are parallel to each other. The deck may have any camber and any sheer desired, but all curvature in the plating is in a longitudinal direction or approximately longitudinal.

Instead of the usual round camber I make the camber up of a number of straight lines.

The plating of an ordinary deck has curvature in both directions, but I avoid the curvature in a transverse direction.

Any style of framing may be used in conjunction with this invention. If longitudinal framing is used the curvature and the bevel (if beveled) are the same in different longitudinal members in the same fore and aft position and on the same non-twisted surface provided the members lie in parallel planes, thus facilitating the forming of these members. Where transverse framing is used it comprises straight lengths and the beveling of the frames is uniform throughout each straight length.

Specially shaped plates may be used locally such as for making connection to stem, keel, stern post and at other places in conjunction or with a hull mainly formed as described above.

Referring to the drawings filed herewith:—

All of these drawings have been arranged on a transverse scale greater than the longitudinal scale for the sake of clearness.

In Figs. 1 to 6 (inclusive), $w'$, $w^2$, $w^3$, and so forth indicate various water lines (or planes), $B'$, $B^2$, $B^3$ and so forth indicate various bow and buttock lines (or planes) and 1, 2, 3 and so forth indicate various transverse sections perpendicular to the water planes and to the bow and buttock planes. These lines show in the usual manner the features of a ship designed according to this invention. The different surfaces forming the sides and bottom are marked thus AA, BB, CC, and so forth. The chines forming the junctions between surfaces are marked thus $ab$, $bc$, $cd$, and so forth. The same letters and figures are adhered to for the same parts in different views. For the sake of clearness angular chines have been shown in these six figures. Fig. 7 shows a form with rounded chines.

Figures 1, 2:
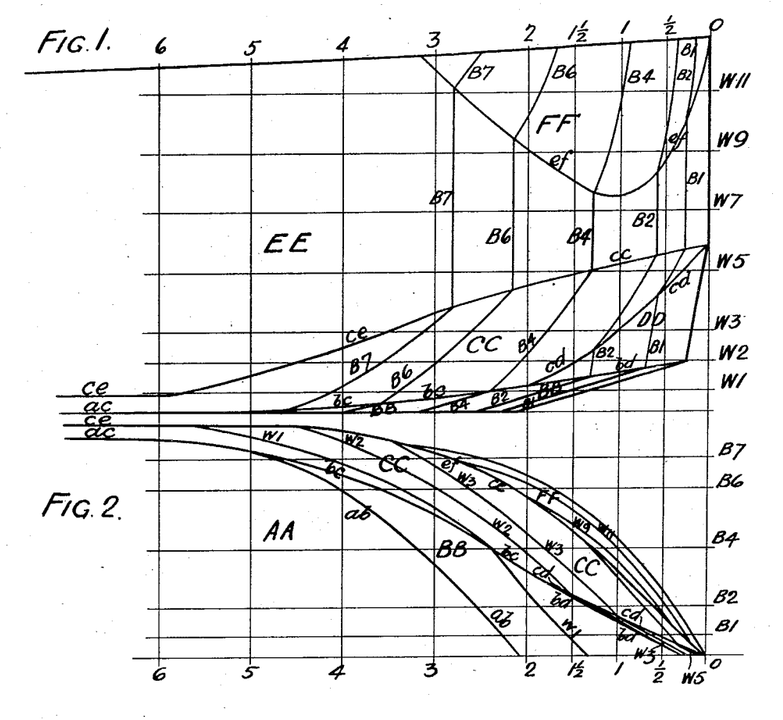
Figure 1 is a sheer elevation of fore body.
Fig. 2 is a half breadth plan of fore body.
Figures 3, 4:
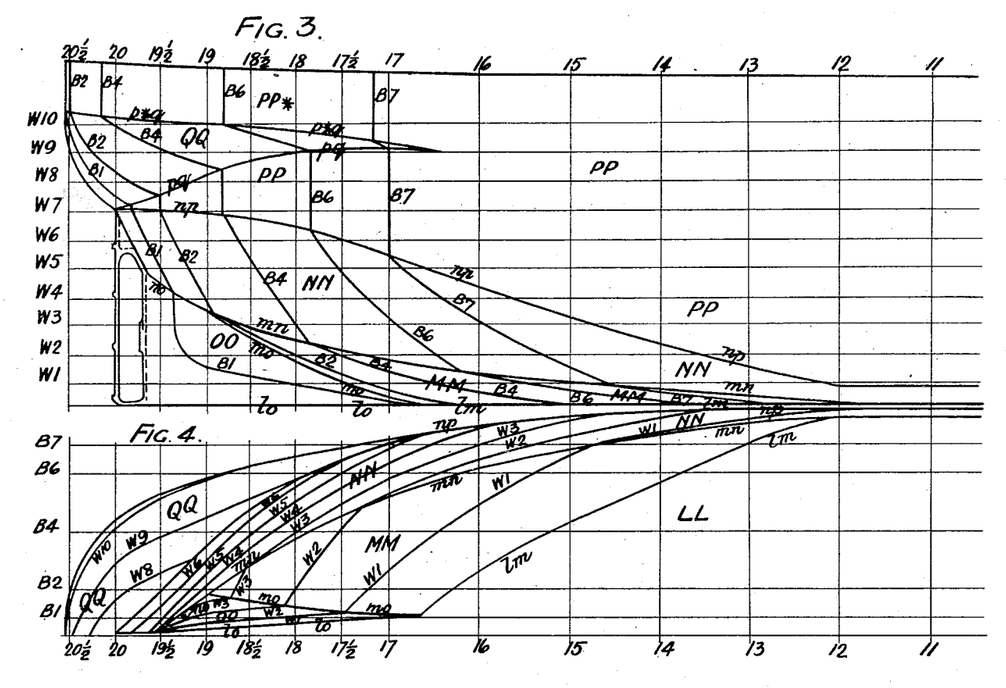
Fig. 3 is a sheer elevation of after body.
Fig. 4 is a half breadth plan of after body.
Figures 5, 6, 7, 8, 9, 11, 12:
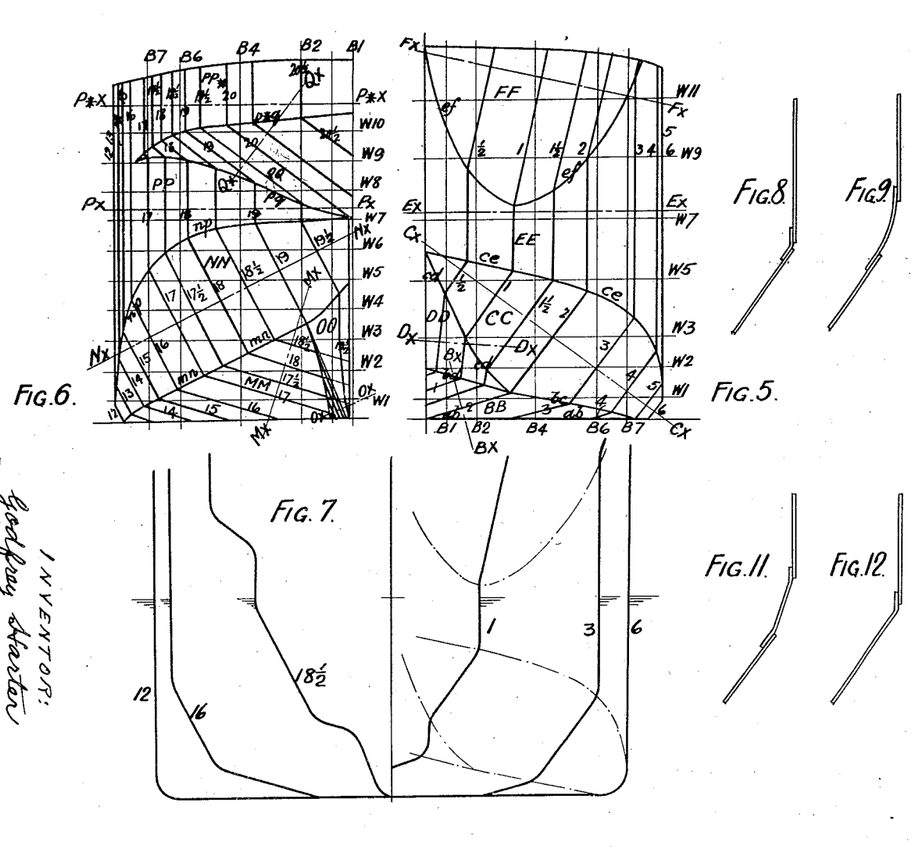
Figs. 5 and 6 are body plans of fore body and after body respectively.
Fig. 7 is a body plan with rounded chines.
Figs. 8 to 13 (inclusive) are details of chines, to an enlarged scale.

It will be noted that the chines though usually convex, viewed from the outside, are sometimes concave as for instance, $ef$ and $cd$ on Figs. 1, 2 and 5, $pq$ and $mo$ in Figs. 3, 4 and 6.

In Figs. 3, 4 and 6 showing an after body it will be seen that part of the plating aft of transverse section 19 and below water plane $w^5$ is twisted, and therefore is not of the form mainly used in a ship constructed according to this invention. This is merely an instance however of a local departure from the form of surface generally used in this invention and the extent and location of such departures will vary in different ships.

Figure 10:
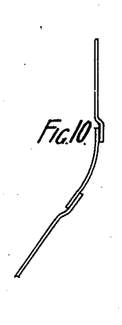
Figure 13:
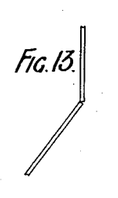

Figs. 8 to 13 inclusive show various forms of connection between the non-twisted surfaces at the chines to an enlarged scale. Fig. 8 shows an angular chine with a narrow strap or angle as the covering strip. Figs. 9 and 10 show a rounded chine with wide chine plate. In Fig. 10 the plating is joggled. Fig. 11 shows a chamfered chine with wide chine plate. Fig. 12 shows the plate flanged and no covering strip used. Fig. 13 shows the edges of the surfaces simply butted for welding.

Referring back to Fig. 5 there will be seen dot and dash lines $Bx$, $Bx$, drawn through surface BB, $Cx$, $Cx$, drawn through CC . . ., $Fx$, $Fx$, drawn through FF, and on Fig. 6 $Mx$, $Mx$, drawn through MM, $Nx$, $Nx$, through NN . . ., $Qx$, $Qx$, through QQ. These represent imaginary intersecting planes perpendicular to the relative non-twisted surfaces at all points.

Figure 14:
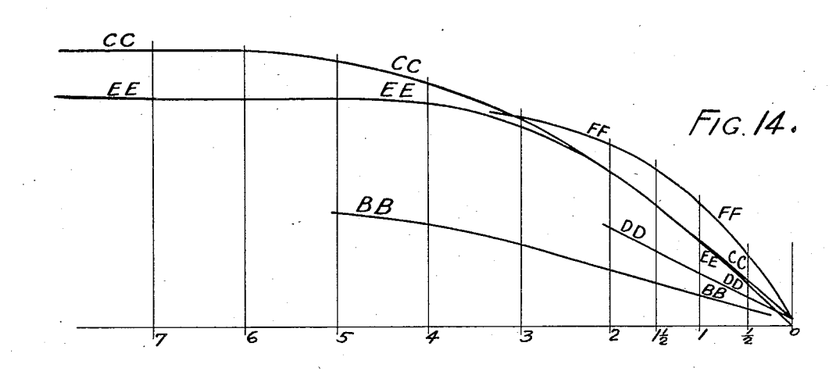
Fig. 14 are sections through fore body non-twisted surfaces.
Figure 15:
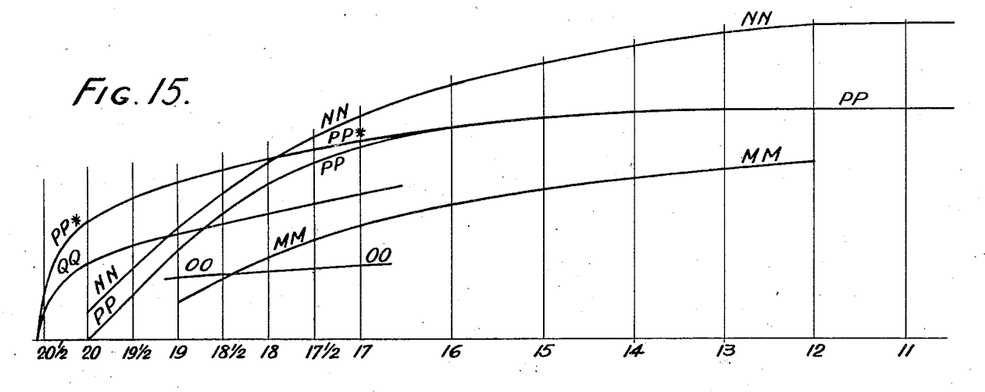
Fig. 15 are sections through after body non-twisted surfaces.
Figure 16:
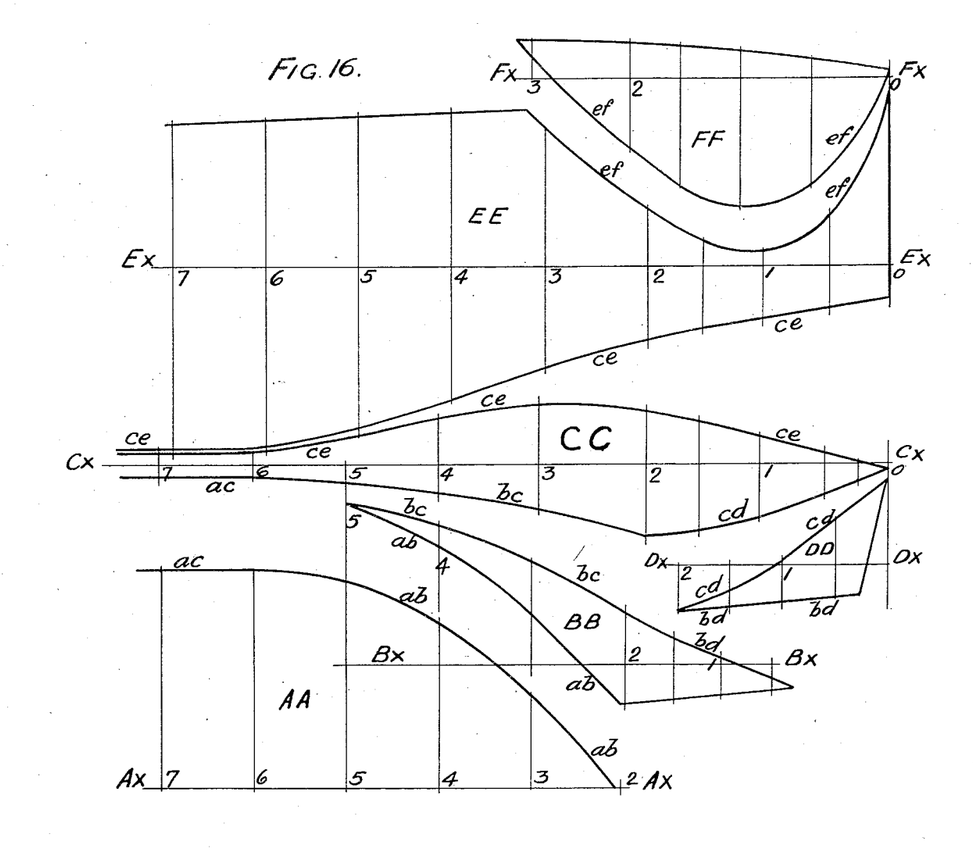
Fig. 16 is an expansion of fore body non-twisted surfaces with angular chines.
Figure 17:
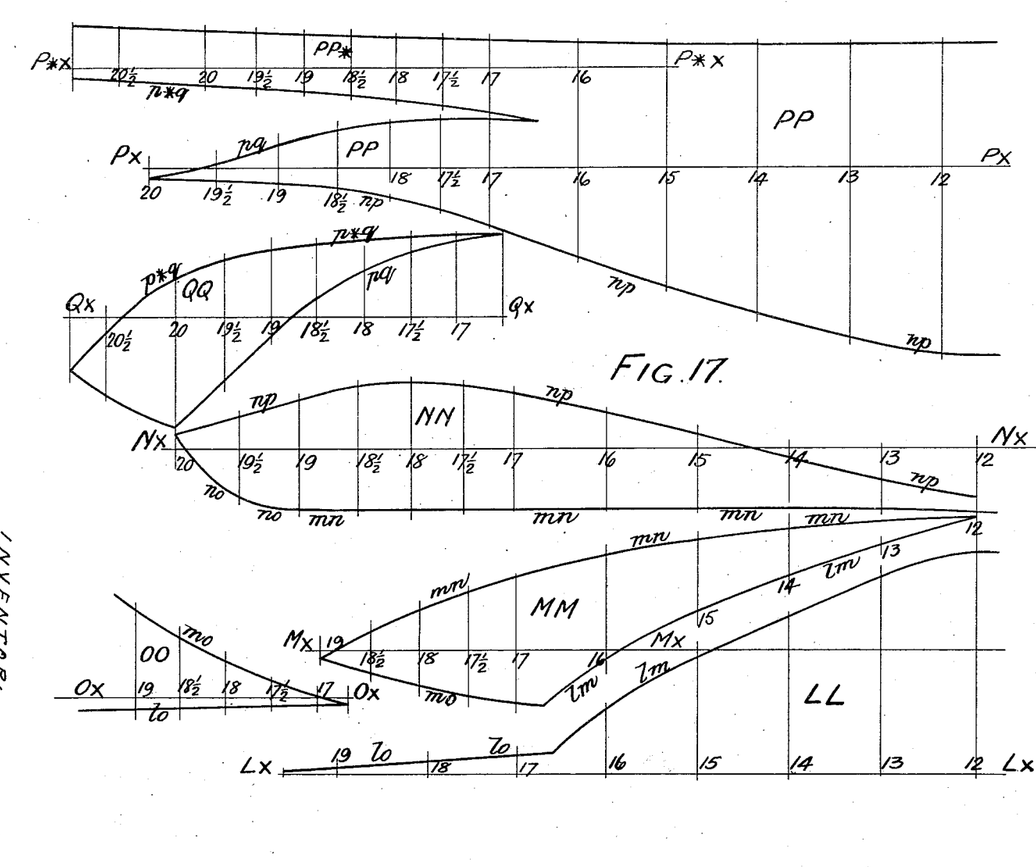
Fig. 17 is an expansion of after body non-twisted surface with angular chines.
Figure 18:
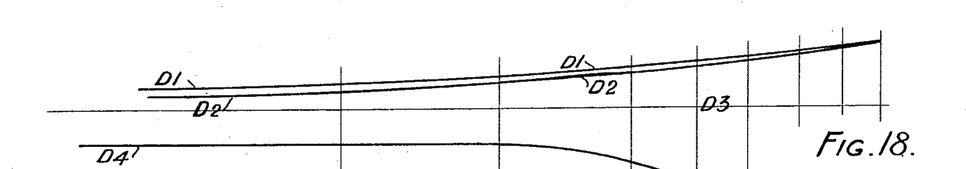
Figs. 18 to 21 (inclusive) are elevations and plans of decks of fore and after bodies respectively.
Figures 19, 20:
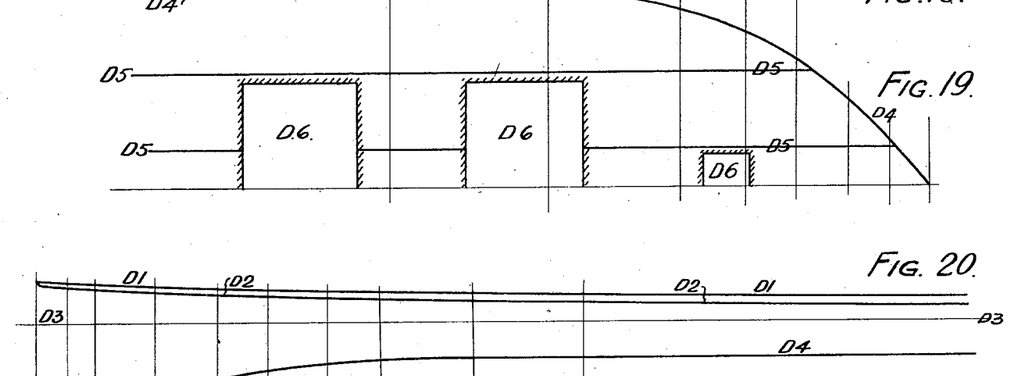
Figure 21:
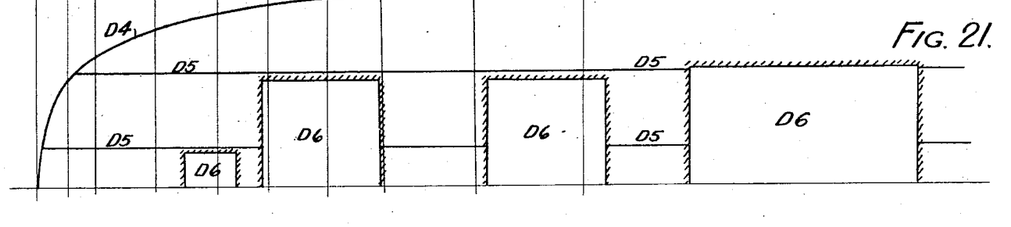

In Figs. 14 and 15 are shown the traces of the intersecting planes and the respective non-twisted surfaces (or the surfaces produced transversely), these being lettered to correspond with the surfaces represented. The true or developed length of the non-twisted surface is shown by the curved lines in Figs. 14 and 15, as also is the exact length of the skin plating between each transverse section. Figs. 16 and 17 show the expansion or development of the non-twisted surfaces of the fore body and after body respectively. This is obtained as follows: For each non-twisted surface a longitudinal line is drawn as for instance $Cx$, $Cx$, in the case of surface CC. The distances apart of the transverse sections 1, 2, 3, 4, 5, and 6, are then measured along the corresponding section line CC, CC, in Fig. 14 and transferred to the line $Cx$ $Cx$ in Fig. 16. Next in Fig. 5 the distances from the line $Cx$ $Cx$ to the chine *ce* at every transverse section 1, 2, 3, 4, 5 and 6 is measured and transferred to Fig. 16, being set up from the line C*x*, C*x* to the line *ce*, at the relative stations. Similarly the distances in Fig. 5 from C*x*, C*x* to the chines *cd*, *bc*, *ac*, are transferred and set up on the other side of C*x*, C*x*, and lines are then drawn in Fig. 16 through the points found.

It will be seen from the above that a very large part of the entire skin plating of the ship may be accurately developed on the flat, thus avoiding waste of material when ordering the plates as well as saving time and labor in templeting during construction. It facilitates the building of the ship by fabrication methods that is to say by the accurate preparation of the material from drawings and then assembling direct. When transverse framing is used, if joints are made in the frame members at the chines, it will be possible to fit some or all of the frame members to the plating before assembling on the stocks.

The bending of the plates of the non-twisted surfaces may be done in ordinary rolls or in some cases may be done when being erected. In any case however the work is greatly simplified, less skill and less time being required while as good or better workmanship is secured.

As there is so little work done in forming the plates of the non-twisted surfaces it may be found an advantage to use wider plates, than is now customary, thereby saving in the quantity of riveting to be done. For the same reason plates of a higher tensile strength and less ductility may be used which should allow of lighter scantlings, thereby permitting a greater weight of cargo being carried.

Figure 22:
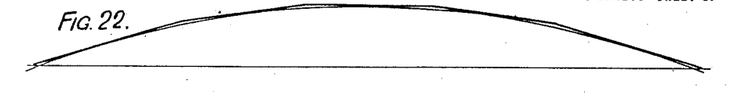
Figs. 22 to 25 (inclusive) are sections through deck.
Figure 23:
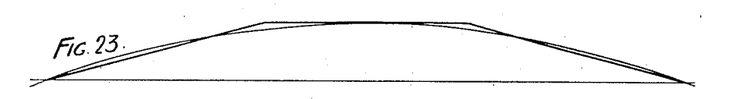
Figure 24:
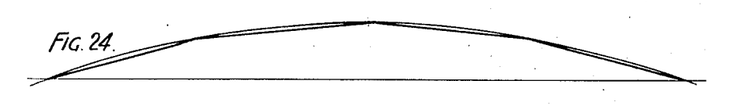
Figure 25:
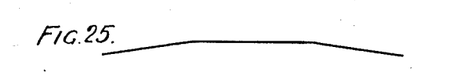
Figure 26:
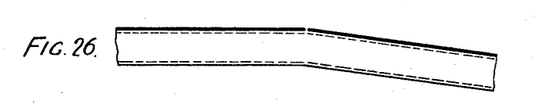
Figs. 26 to 30 are details of deck chines to an enlarged scale.
Figure 27:
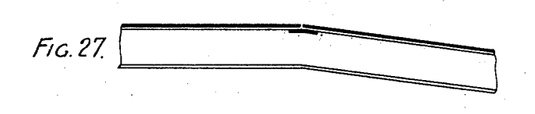
Figure 28:
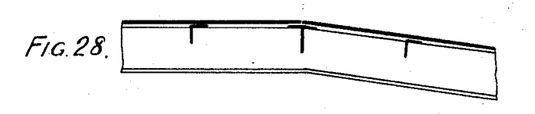
Figure 29:
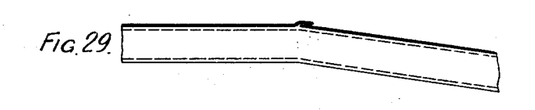
Figure 30:
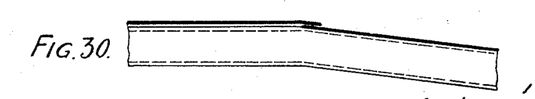
Figure 31:
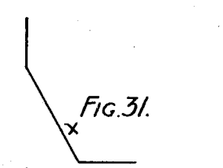
Figs. 31, 32, 33, 34 and 35 are diagrams showing in transverse section the use of two "non-twisted surfaces" which take the place of one twisted surface.
Figure 32:
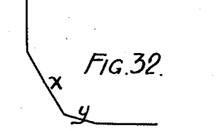
Figure 33:
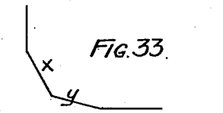
Figure 34:
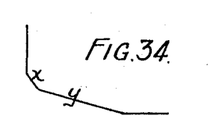
Figure 35:
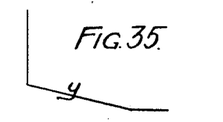

Referring to Figs. 18 to 21 inclusive showing elevation and plan of deck of fore body and after body respectively, D' indicates the elevation of the deck at the center line of the ship, D² the elevation at the side, D³ being a horizontal line drawn parallel to the water line to indicate the amount of the sheer, D⁴ in the plan views shows the edge of the deck at the side of the ship, D⁵ being the chines or joints between different surfaces, D⁶ are openings in the deck for hatchways, machinery spaces and such like. Fig. 22 shows in section a deck of five non-twisted surfaces (three per side). Fig. 23 shows a deck of three non-twisted surfaces (two per side). Fig. 24 shows a deck of four non-twisted surfaces (2 per side). Fig. 25 shows the deck near one end of a vessel where the deck is not so wide. The curved lines in Figs. 22 to 25 show the line of a corresponding curved deck of usual form. In Figs. 22 to 25 the camber of the deck has been exaggerated for the sake of clearness. Figs. 26 to 30 (inclusive) show various methods of making the longitudinal seam between the non-twisted surfaces of a deck but these seams may be made in any suitable manner. Fig. 26 shows a welded seam.

Figs. 31 to 35 (inclusive) show how two "non-twisted surfaces" may be made to take the place of one twisted surface. These show transverse sections through surfaces at different points. Surface *x* is shown dying away from a full width in Fig. 31 to nothing in Fig. 35, while surface *y* starts from nothing in Fig. 31 and reaches full width in Fig. 35. The same feature may be observed in Figs. 5, 6 and 7, but does not there show so clearly.

Although these drawings show only one type of ship, namely with vertical stem, vertical side, flat floor and counter, it will be understood that ships may be built in accordance with this invention of other types as for instance with inclined stem, inclined floor, flaring sides, tumble-home sides, square stern, pointed stern, cruiser stern (submerged counter) or any other type.

As this invention renders the fore bodies and after bodies easier to construct than by the usual methods, it may be found profitable to reduce the length of the parallel middle body and increase the lengths of fore body and after body, as compared with a vessel of the usual form making the lines finer and increasing the beam or draft or both, thereby further economizing in propulsive effort.

What I claim and desire to secure by Letters Patent is:—

1. Navigable sea going ships, comprising a body, the form of whose bottom and sides consists mainly of a number of non-twisted surfaces, there being not less than three such surfaces on each side of the longitudinal vertical center plane and not less than three such surfaces side by side for the greater part of the length of the fore body and after body on each side of the longitudinal vertical center plane the surfaces having a curvature in the longitudinal direction only and being such that any lines drawn on a surface transversely are straight and parallel to each other.

2. Navigable sea-going ships comprising a fore body and an after body whose bottom and sides are formed with two or more chine surfaces on each side of the longitudinal vertical center plane, these chine surfaces consisting of plates formed to an approximately uniform transverse section throughout the length of a chine.

3. Navigable sea-going ships as claimed in claim 1 in combination with wide chine plates of approximately uniform transverse section chamfered in a transverse direction.

4. In navigable ships a deck extending over the body consisting mainly of a plurality of non-twisted surfaces side by side in the width of the deck, the surfaces having curvature in the longitudinal direction only and being such that any lines drawn on the surface approximately transversely are straight and are parallel to each other.

5. In navigable ships the combination of a fore body and an after body whose bottom and sides are constructed as claimed in claim 1, with a deck extending over the body and consisting mainly of a plurality of non-twisted surfaces side by side in the width of the deck, the surfaces having curvature in the longitudinal direction only and being such that any lines drawn on the surface approximately transversely are straight and are parallel to each other.

6. In navigable ships, the combination of a fore body and an after body whose bottom and sides are constructed as claimed in claim 2, with a deck extending over the body consisting mainly of a plurality of non-twisted surfaces side by side in the width of the deck, the surfaces having curvature in the longitudinal direction only and being such that any lines drawn on the surface transversely or approximately transversely are straight and are parallel to each other.

7. Navigable seagoing ships comprising a body, the form of whose bottom and sides consists mainly of a number of non-twisted surfaces, there being not less than three such surfaces on each side of the longitudinal vertical center plane and not less than three such surfaces side by side for the greater part of the length of the body on each side of the longitudinal vertical center plane, the surfaces having curvature in the longitudinal direction only and being such that any lines drawn on a surface transversely are straight and parallel to each other, in combination with a plurality of chine surfaces on each side of the longitudinal vertical center plane, these chine surfaces consisting of plates formed to an approximately uniform transverse section throughout the length of a chine, which plates are curved in transverse section, and a deck extending over the body consisting mainly of a plurality of non-twisted surfaces side by side in the width of the deck, the surfaces having curvature in the longitudinal direction only and being such that any lines drawn on the surface approximately transversely are straight and are parallel to each other.

In testimony whereof I have signed my name to this specification.

GODFREY HARTER.